Oct. 27, 1925.  
W. A. TURBAYNE  
DOUBLE VOLTAGE SYSTEM  
Filed Jan. 17, 1921  
1,559,385

INVENTOR.  
*William A. Turbayne*  
BY Raymond H. Van Nest  
ATTORNEYS.

Patented Oct. 27, 1925.

1,559,385

UNITED STATES PATENT OFFICE.

WILLIAM A. TURBAYNE, OF NIAGARA FALLS, NEW YORK, ASSIGNOR, BY MESNE ASSIGNMENTS, TO THE SAFETY CAR HEATING AND LIGHTING COMPANY, OF NEW YORK, N. Y., A CORPORATION OF NEW JERSEY.

DOUBLE VOLTAGE SYSTEM.

Application filed January 17, 1921. Serial No. 437,677.

*To all whom it may concern:*

Be it known that I, WILLIAM A. TURBAYNE, a citizen of the United States, residing at Niagara Falls, in the county of Niagara and State of New York, have invented new and useful Improvements in Double Voltage Systems, of which the following is a specification.

The present invention relates to double voltage systems involving translation circuit regulation means.

More particularly the present invention relates to electrical systems involving a double circuit generator, a translation circuit and means for storing up energy for use when the generator is not operative. When driven at or above a critical speed, said generator supplies said translation circuit and in an independent circuit, charges the storage battery. When the generator is inoperative or is being driven at low speeds, a battery supplies the energy for the translation circuit. In order to avoid undesirable flickering in the voltage across the translation circuit during the transition period when the generator voltage is decreasing and the battery is assuming the burden of supplying the demand of the translation circuit, it is necessary to make special provision.

An object of the present invention is to provide a system of the kind above referred to in which the transition from generator to battery may be accomplished with a minimum of fluctuation across the translation circuit.

A further object is to provide a system of the kind above referred to in which an auxiliary storage battery is used to prevent undesirable fluctuations across the translation circuit.

Further objects will appear as the description proceeds.

The present invention has been illustrated in connection with the double circuit generator illustrated and described in application for United States Patent No. 202,442, by the present applicant. The invention is not limited, however, to the type of double circuit generator illustrated therein.

Referring to the drawings—

Figure 1:
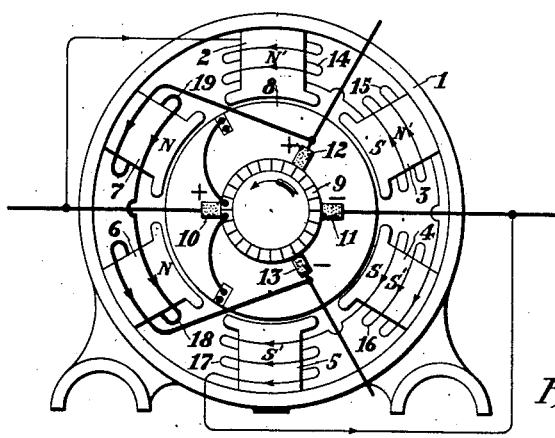
Figure 1 illustrates diagrammatically a double circuit generator which may be used in the practice of the present invention.

Referring first to Figure 1, the numeral 1 indicates a magnetic field frame provided with six pole pieces 2, 3, 4, 5, 6, and 7. Cooperating with the field poles is an armature 8 provided with a commutator 9. Said commutator 9 has contacting therewith a pair of brushes 10 and 11 and a second pair of brushes 12 and 13. In order that the description may be simplified, it will be assumed in this description that armature coils with symmetrical end connectors are provided, whereby the position of the brushes will indicate the location of the coils connected thereto. Each of the pole pieces 2, 3, 4 and 5 is provided with a field winding, numbered 14, 15, 16 and 17 respectively. These field windings 14, 15, 16 and 17 are connected in series across brushes 10 and 11 and are wound to cause pole pieces 2 and 3 to be of one polarity, indicated by the characters N', and the pole pieces 4 and 5 to be of the opposite polarity, indicated by the characters S'. The windings 14, 15, 16 and 17 will therefore produce a field flux having a curved path having axes which lie mid-way between the pole pieces 2 and 3 on the one hand and mid-way between pole pieces 4 and 5 on the other hand. Brushes 12 and 13 are located substantially in the axes of this field flux. Pole pieces 6 and 7 are provided with field windings 18 and 19 respectively, which are connected in series across brushes 12 and 13. Coils 18 and 19 are wound to produce poles of like polarity. This polarity will depend upon the relative polarity of brushes 12 and 13.

The armature should preferably be wound with coils having a pitch of substantially 120 degrees, for reasons which will appear hereinafter. Though the generator is shown as provided with six pole pieces, it in reality operates as a bipolar machine. It will be obvious that the number of magnetic circuits may be multiplied as desired, in which case the actual pitch of the armature winding must be correspondingly changed.

Multiplication of the number of magnetic circuits will not change the principle of the machine which is herein illustrated and described in a simple form, so long as the magnetic and electrical relations between the various parts are maintained.

In explaining the operation of the generator illustrated in Figure 1, we may first consider that the armature has a counter clock-wise direction of rotation. As the armature conductors pass through the field of flux passing from poles 2 and 3 to poles 4 and 5, an E. M. F. will be set up across brushes 12 and 13. Inasmuch as windings 18 and 19 are connected to said brushes 12 and 13, current will flow through said windings to energize poles 6 and 7 with a polarity indicated as N. Furthermore, the current in the armature conductors will produce an M. M. F. in the right hand direction, aiding the flux from poles 6 and 7. There will therefore be produced a resultant field of flux which, for purposes of explanation, may be resolved into two components, one of which threads the armature from pole pieces 2 and 3 to pole pieces 4 and 5 along axes spaced substantially 120 degrees apart, while the other component threads the armature horizontally along axes spaced 180 degrees apart. The horizontal component, passing from the pole pieces 7 and 8, will tend to make the pole pieces 3 and 4 of negative polarity, indicated by the character S. The 120 degrees armature pitch above referred to, has been found to be the pitch which will co-operate best with both flux components.

It will be obvious that if the direction of the armature rotation is reversed, the polarity of brushes 12 and 13 will be reversed, in which case the polarities of the poles 6 and 7 will be reversed, as will also the M. M. F. produced by the current in the armature conductors. The horizontal flux component will thus be reversed, which will result in the advantage that with the reversal in the direction of armature rotation, the polarity of brushes 10 and 11 will be unchanged. Consequently, the polarity of the field windings 14, 15, 16 and 17 will be constant, no matter what the direction of armature rotation.

Figure 2:
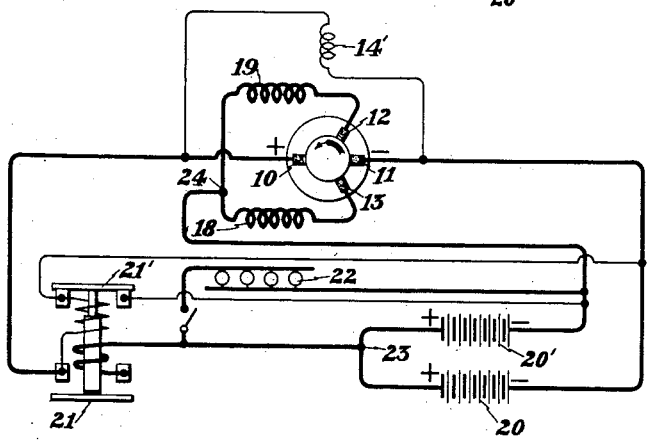
Fig. 2 represents one embodiment of the present invention.

Referring now to Figure 2, a system is shown illustrating the application of the present invention to the double circuit generator illustrated in Fig. 1. In Fig. 2 the four field windings 14, 15, 16 and 17 are illustrated for the sake of simplicity as a single winding indicated as 14'. Brush 10, which is indicated as positive, is connected to the positive terminal of the storage battery 20 through automatic switch 21. The negative terminal of the storage battery 20 is connected to the negative brush 11. The translation circuit 22 is connected on one side to the point 23 between the automatic switch 21 and the positive terminal of the storage battery, and on the other side to the point 24 between windings 18 and 19. Connected across the translation circuit is an auxiliary storage battery 20', which battery is provided for the purpose of avoiding undesirable fluctuations in the translation circuit voltage. Said auxiliary battery 20' is connected in parallel relation to the storage battery 20 under predetermined conditions, by means which will now be described.

Connected to operate with the automatic switch 21 is a switch 21', which switch 21' will be closed when automatic switch 21 is open and will be open when automatic switch 21 is closed. Said switch 21' closes a circuit between like terminals of the storage batteries 20' and 20, which like terminals have been indicated in the drawings as negative. Inasmuch as the positive terminals of storage battery 20' and storage battery 20 are connected together at the point 23, operation of the switch 21' when closed is to connect the two batteries in parallel relation.

A mode of operation of the system illustrated in Fig. 2 will be substantially as follows:

As the generator speeds up the voltage at brushes 10 and 11 will rise until automatic switch 21 closes. Current will now flow from the positive brush 10 through automatic switch 21 and storage battery 20, back to the negative brush 11. If the translation circuit 22 is closed, current will be diverted at point 23 and will pass through said translation circuit 22 to the point 24. From the point 24, the current has two paths, but inasmuch as, with the counter clockwise direction indicated, the brush 13 will be negative, the current will pass through winding 18 to brush 13, supplementing current flowing from the brush 12 through windings 19 and 18 to brush 13. As the current flowing between brushes 10 and 11 tends to increase, the magnetizing effect thereof will increase, which will be in a direction to oppose the flux component between poles 2—3 and poles 4—5. This magnetizing effect of the armature current between brushes 10 and 11 will therefore tend to hold the current output supplied from brushes 10 and 11 to a constant value. When the translation circuit 22 is closed and current flows from brush 10 through said translation circuit and winding 18 to the brush 13, the added excitation of winding 18, together with the added M. M. F. due to the current flowing through armature conductors between brushes 13 and 10 will have a compounding effect which will hold up the voltage across said translation circuit within certain limits of output. Upon reversal of direction of armature rotation, the polarities of brushes 12 and 13 are reversed, as explained above and translation circuit current will return to the armature through winding 19. The regulating functions will be similar to those outlined for counter clockwise rotation.

When the E. M. F. developed across brushes 10 and 11 falls off, due for instance to slowing down of the armature, the automatic switch 21 will automatically open, resulting in the closure of the switch 21', thereby throwing auxiliary battery 20' in direct parallel relation with battery 20. Decrease in voltage across brushes 10 and 11 is, of course, accompanied by a corresponding decrease in the voltage impressed across translation circuit 22. The auxiliary storage battery 20' will be designed, however, to have a discharge voltage substantially equal to the voltage which is normally impressed across translation circuit 22 and will discharge during the period of transition to maintain the voltage across said translation circuit. Said auxiliary battery 20' will have its charge maintained by reason of its intermittent parallel connection with the battery 20. Inasmuch as the battery 20 will be connected to the terminals of the auxiliary battery 20' at a time immediately after the battery 20 has been on charge, the "gas" voltage will result in a material flow of current into the auxiliary battery 20', whereby said battery 20' will be maintained in charged condition.

Figure 3:
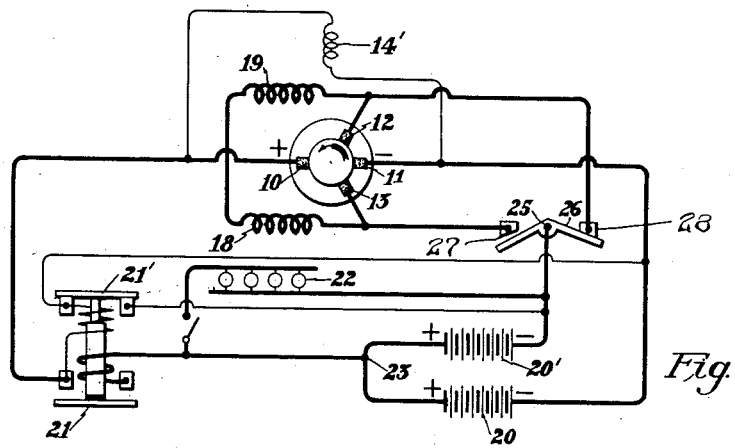
Fig. 3 represents a modified embodiment of the present invention.

Figure 3 represents a modification of the arrangement illustrated in Fig. 2 whereby the result is accomplished that translation circuit current will be constrained to flow through both windings 19 and 18 instead of only one of said windings, as in Fig. 2. In Fig. 3, the return side of the translation circuit 22 is connected to the mid-point 25 of a rocking switch 26. Said rocking switch 26 is adapted to selectively contact with either contact 27 or contact 28. Contact 27 is connected to one end of the winding 18 and to the brush 13, while contact 28 is connected to one end of the winding 19 and to brush 12. Any preferred means may be provided for rocking the switch 26. It will be sufficient to state that said switch 26 should be rocked from one of its contacting positions to the other contacting position upon reversal of armature rotation. Said rocking may be accomplished mechanically or electrically, as preferred. In the position of the rocking switch illustrated in Fig. 3, translation circuit current will return through contact 28 and windings 19 and 18 to brush 13, whereby both windings 19 and 18 will be excited to hold up the horizontal field of flux. This, together with the added current flowing through armature conductors between brushes 13 and 10, will compensate for any drop in voltage in the armature conductors due to said added current and will hold up the voltage across brushes 12 and 13, whereby no diminution in the voltage across the translation circuit will occur with increases in load. If desired, the machine may be over-compounded. Any desired characteristic may be secured by suitably choosing the windings. Upon a reversal of armature rotation, the polarity of brushes 12 and 13 will change in the manner explained above. At the same time, the switch 26 will be rocked to a position to contact with contact 27, whereby the direction of current flow through windings 18 and 19 will be reversed. The voltage will be held up, therefore, regardless of the direction of rotation of the armature.

The embodiment of the present invention chosen for illustration should not be considered in a limiting sense. The invention is of broad application and may be applied to other systems than those illustrated, in which the translation circuit is supplied at times directly from a generator and at other times from a storage battery. It is intended in this patent to cover all such embodiments that come within the scope of the invention as defined by the appended claims.

What I claim as new and desire to secure by Letters Patent of the United States, is—

1. In a system, a double circuit generator, a battery connected in one circuit thereof, a translation circuit connected to be supplied by the other circuit thereof, said battery being connected to said translation circuit to supply said translation circuit when said generator is not developing a sufficiently high voltage, and an auxiliary battery permanently connected across said translation circuit during the entire time the translation circuit is closed.

2. In a system, a double circuit generator, a battery connected in one circuit thereof, a translation circuit connected to be supplied by the other circuit thereof, an automatic switch for connecting said battery to or disconnecting said battery from said generator in response to electrical conditions, said battery being connected to said translation circuit to supply said translation circuit when said generator is not developing a sufficiently high voltage, an auxiliary battery permanently connected across said translation circuit during the entire time the translation circuit is closed, and means operating synchronously with said automatic switch for connecting said batteries in parallel.

3. In a system, in combination, a double circuit generator, a battery connected to be charged in one circuit thereof, a translation circuit connected to be supplied by the other circuit thereof, said battery being connected to said translation circuit through a field winding of said generator, an auxiliary battery permanently connected across said translation circuit during the entire time the translation circuit is closed, and means for connecting said batteries in parallel when said first mentioned battery is removed from charging relation to said generator.

4. In a system, in combination, a double circuit generator, a battery connected to be charged in one circuit thereof, a translation circuit connected to be supplied by the other circuit thereof, said battery being connected to said translation circuit through a field winding of said generator, an automatic switch for connecting and disconnecting said battery from said generator, an auxiliary battery permanently connected across said translation circuit during the entire time the translation circuit is closed, and means operating synchronously with said automatic switch for connecting said batteries in parallel relation.

5. In combination, a dynamo electric machine having field windings whose polarity is inherently responsive to the direction of armature rotation, a pair of circuits supplied by said machine, one of said circuits being completed through said field windings, a storage battery in one of said circuits, the other of said circuits comprising a translation circuit, an automatic switch in said battery circuit, an auxiliary battery across said translation circuit, and means operating synchronously with said switch for connecting said batteries in parallel.

In witness whereof, I have hereunto subscribed my name.

WILLIAM A. TURBAYNE.